United States Patent [19]

Nishimura et al.

[11] Patent Number: 4,636,484

[45] Date of Patent: Jan. 13, 1987

[54] METHOD FOR THE PREPARATION OF CATALYST COMPOSITION FOR USE IN CRACKING HYDROCARBONS

[75] Inventors: Yoichi Nishimura, Yokohama; Masamitsu Ogata; Takanori Ida, both of Kitakyusyu, all of Japan

[73] Assignee: Catalysts & Chemicals Industries Co., Ltd., Tokyo, Japan

[21] Appl. No.: 741,670

[22] PCT Filed: Sep. 22, 1983

[86] PCT No.: PCT/JP83/00312

§ 371 Date: May 15, 1985

§ 102(e) Date: May 15, 1985

[87] PCT Pub. No.: WO85/01225

PCT Pub. Date: Mar. 28, 1985

[51] Int. Cl.$^4$ ............................................. B01J 29/06
[52] U.S. Cl. ........................................ 502/65; 502/68
[58] Field of Search ..................... 502/65, 68, 10, 8

[56] References Cited

U.S. PATENT DOCUMENTS

| | | | |
|---|---|---|---|
| 3,930,987 | 1/1976 | Grand | 502/65 X |
| 3,957,689 | 5/1976 | Ostermaier et al. | 502/65 |
| 4,407,735 | 10/1983 | Sawamura | 502/10 |
| 4,411,771 | 10/1983 | Bambrick et al. | 502/10 X |
| 4,480,047 | 10/1984 | Beck et al. | 502/65 |

*Primary Examiner*—Carl F. Dees
*Attorney, Agent, or Firm*—Flynn, Thiel, Boutell & Tanis

[57] ABSTRACT

According to the present invention, a catalyst composition for use in cracking hydrocarbon can be prepared by spray drying an aqueous slurry containing a flash calcined alumina obtained by contacting an aluminum hydroxide with a hot air of 350°–700° C. in a short time within 5 seconds, kaolin, a precursor substance of a silica-system matrix and a crystalline aluminosilicate. Since this catalyst composition contains the flash calcined alumina and kaolin in addition to the siliceous matrix and the crystalline aluminosilicate, it can exhibit an excellent selectivity for production of intermediate fractions such as kerosene, gas oil and the like, when used for catalytic cracking of hydrocarbon.

7 Claims, No Drawings

METHOD FOR THE PREPARATION OF CATALYST COMPOSITION FOR USE IN CRACKING HYDROCARBONS

TECHNICAL FIELD

The present invention relates to a method for the preparation of a catalyst composition for use in catalytic cracking of hydrocarbons, in particular relates to a method for the preparation of a catalyst composition that has a high cracking activity and can produce not only a gasoline fraction but also an intermediate fraction of such as kerosene or gas oil with high yields.

BACKGROUND ART

In the catalytic cracking of hydrocarbons, as catalysts there have usually been employed refractory inorganic oxides such as silica-alumina, silica-magnesia, silica-zirconia, alumina-boria and the like; compositions obtained by dispersing a crystalline aluminosilicate zeolite in these inorganic oxides, and these compositions compounded with clay minerals such as kaolin and the like. Since the catalytic cracking of hydrocarbons is normally carried out for the main purpose of producing gasoline, it is preferable to use catalysts which are high in cracking activity and further can obtain high octane number gasoline fractions with high yields, in other words to use catalysts which are high in gasoline selectivity. In view of this, catalysts have usually been used by preference which are obtained by dispersing a crystalline aluminosilicate zeolite in a siliceous matrix including silica-alumina, silica-magnesia or the like.

It is said that the catalysts for use in catalytic cracking of hydrocarbons preferably should be superior in the thermal and hydrothermal stability and attrition resistance in addition to the above mentioned cracking activity and gasoline selectivity. In the catalytic cracking process of hydrocarbons, it is common that spent catalysts are regenerated by separation of carbonaceous substances deposited thereon, and thereafter said regenerated catalysts are again available for catalytic cracking reaction. Said regeneration treatment comprises stripping hydrocarbons from a spent catalyst with steam, and in succession burning off the carbonaceous deposits from the spent catalyst in the presence of oxygen. Due to this, in case the catalyst is inferior in the thermal and hydrothermal stability, the activity of the catalyst is destroyed at the time of regeneration and the regenerated catalyst exhibits only considerably low cracking activity and gasoline selectivity as compared with fresh catalysts. Further, because of the fact that the recent catalytic cracking, as a rule, mostly uses a fluidized-bed reactor, if the catalyst is insufficient in attrition resistance, the catalyst is pulverized in the fluidized bed and lost out of the system, and this is one reason for damaging the cracking activity and gasoline selectivity of the catalyst, too.

In the light of these circumstances, the inventors of the present application have previously proposed that the catalyst composition obtained by compounding the alumina, which may be detected to be crystalline using the X-ray diffraction method, with the siliceous matrix such as silica-alumina, and further dispersing the crystalline aluminosilicate zeolite therein is superior in cracking activity and gasoline selectivity and further exhibits excellent stability against thermal and hydrothermal and attrition resistance (which see Japanese Laid Open Patent Application No. 152548/1980).

The inventors of the present application have studied to improve the previously presented catalyst furthermore and develop a catalyst for use in catalytic cracking which may exhibit a high selectivity in the preparation of an intermediate fraction such as kerosene, gas oil or the like, and have discovered that a catalyst can be endowed, without damaging the various characteristics of the previously proposed catalyst, with a selectivity against the production of an intermediate fraction, by using a flash calcined alumina referred to afterwards as the alumina which may be detected to be crystalline using the X-ray diffraction method and simultaneously mixing kaolin in the catalyst.

DISCLOSURE OF INVENTION

The method for the preparation of a catalyst for use in catalytic cracking according to the present invention is characterized by spray-drying an aqueous slurry containing a flash calcined alumina obtained by contacting the aluminum hydroxide prepared by the Bayer process with a hot air of 350°–700° C. for 5 seconds; kaolin; a precursor of a siliceous matrix; a crystalline aluminosilicate zeolite. According to the findings obtained by the inventors of the present invention, it has been observed that in order to improve the selectivity against the production of an intermediate fraction it is essential to mix both the flash calcined alumina and kaolin in the siliceous matrix wherein the crystalline aluminosilicate zeolite has been dispersed, and when either alone is mixed it is impossible to improve the selectivity fully to such an extent as intended initially. Although the logical ground for this is not always elucidated, it may be estimated that the use of the flash calcined alumina in combination with kaolin may provide the catalyst with pores through which hydrocarbon molecules easily diffuse, whereby the activity of the crystalline aluminosilicate zeolite can be displayed to the full while preventing over-cracking of hydrocarbon, and thus the amounts of not only gasoline fraction but also intermediate fraction such as kerosene, gas oil or the like produced may increase. In this connection, it is to be noted that the catalyst prepared according to the present invention is provided with pores having a diameter of 1000 Å–3000 Å measured by means of a porosimeter method.

The flash calcined alumina used in the present invention can be obtained by contacting the aluminum hydroxide (gibbsite) produced by the Bayer process with a hot air of 350°–700° C., preferably 550°–650° C., in a short time for rapid dehydration. In this instance, the time required for contact with the hot air is extremely important, which is normally 5 seconds or less, preferably 1 second or less. This rapid dehydration is conducted so as to crack the gibbsite without destroying the hexagonal laminar crystal and thus there can be obtained a highly active alumina. In this connection, it is to be noted that this flash calcined alumina, as disclosed also in Japanese Laid Open Patent Application No. 91595/1975, has been identified as being chi-alumina when measured by means of X-ray diffraction. The present invention employs, as a preferable kaolin, kaolinite having the same hexagonal laminar crystal as the gibbsite does.

According to the method of the present invention, the intended catalytic cracking catalyst can be obtained by preparing an aqueous slurry containing the above mentioned flash calcined alumina, kaolin, the precursor of the siliceous matrix and the crystalline aluminosilicate zeolite, and spray-drying it in a conventional manner. As the precursor of the siliceous matrix, there are normally used a silicic acid solution, silica hydrosol, silica-alumina hydrosol, silica-magnesia hydrogel and the like. Therefore, said aqueous slurry may be prepared by dispersing the flash calcined alumina, kaolin and crystalline aluminosilicate zeolite in the precursor of siliceous matrix. Preferably, the amount of the flash calcined alumina added is 10–30% of the final weight of the catalyst composition, the amount of the kaolin added is 30–55% of the same, and the amount of the crystalline aluminosilicate zeolite added is 3–40% of the same.

BEST MODE OF CARRYING OUT THE INVENTION

Reference Example (Preparation of the flash calcined alumina)

A flash calcined alumina was obtained by flowing the aluminum hydroxide ($Al_2O_3.3H_2O$) prepared by the Bayer process within a calcination tube wherein a hot air of 650° C. is passing through so that the contact time may become 2 seconds. This flash calcined alumina was identified as being chi-alumina crystal by means of the X-ray diffraction method and was observed to have a composition such as $Al_2O_3.0.5H_2O$.

Comparative Example 1

A water glass solution having a $SiO_2$ concentration of 11.2% was prepared by diluting a commercially available Water Glass No. 3. On the other hand, an aqueous 10.5% aluminum sulfate solution was prepared. The water glass solution and the aluminum sulfate solution were mixed continuously for 10 minutes in the ratio of 20 l/min. to 10 l/min. respectively, thereby preparing a gel. This gel was aged at 65° C. for 3.5 hours and stabilized through adjusting its pH to 5.8 by addition of the water glass. The flash calcined alumina obtained in the above Reference Example was mixed in this gel so that the flash calcined alumina might become 20% based on the final catalyst weight, and this mixture was spray-dried at 220° C., thereby obtaining Catalyst A.

Comparative Example 2

A gel was prepared according to the same procedure as Comparative Example 1. This gel was divided into three parts, and one part itself was spray-dried to thereby obtain Catalyst B. The remaining two parts were mixed with kaolin and bentonite so as to become 20% based on the final catalyst weight respectively, and were spray-dried to obtain catalysts. The kaolin-containing catalyst was named Catalyst C, and the bentonite-containing catalyst was named Catalyst D.

Example 1

A commercially available Water Glass No. 3 was diluted to prepare a water glass solution having a $SiO_2$ concentration of 12.73%. Separately, a sulfuric acid having a concentration of 25% was prepared. This water glass solution and the sulfuric acid were mixed continuously for 10 minutes in the ratio of 20 l/min. to 5.65 l/min. respectively, thereby preparing a silica hydrosol. This silica hydrosol was divided into two parts. The one part was mixed with kaolin and the flash calcined alumina obtained in Reference Example so that each weight might become 55% and 10% respectively based on the final catalyst weight and further was mixed with an aqueous slurry of a rare earth exchanged zeolite Y whose concentration had previously been made 30% so that the content of zeolite might become 15% based on the final catalyst weight. This mixture was spray-dried in a hot air at a temperature of 220° C., and thereafter was washed and dried to obtain Catalyst E.

The other one part of the above mentioned silica hydrosol was mixed with kaolin and the flash calcined alumina so that each weight might become 45% and 20% respectively based on the final catalyst weight and further added with the same zeolite as in Catalyst E. This mixture was spray-dried to obtain Catalyst F.

Comparative Example 3

A silica hydrosol prepared according to the same procedure as Example 1 was added with kaolin so that the amount of it contained in the final catalyst might become 65%, by weight and further added with the aqueous suspension of the rare earth exchanged zeolite Y whose concentration had previously been made 30% so that the content of said zeolite in the final catalyst might become 15% by weight. The resulting mixture was spray-dried, and thereafter washed and dried to prepare Catalyst G.

Example 2

A silica hydrosol was prepared according to the same procedure as Example 1. Apart from this, a hydrogen type zeolite was prepared by subjecting a sodium type faujasite to ammonium ion-exchange in a conventional manner, calcining the same at 550° C. for 3 hours, further subjecting this calcined matter to ammonium ion-exchange, and then calcining this as-wet again at 600° C. for 3 hours. The above mentioned silica hydrosol was divided into two parts. The one part was mixed with kaolin and the flash calcined alumina of Reference Example so that each weight might become 50% and 10% respectively in the final catalyst. This mixture was further mixed with the aqueous suspension of the above mentioned hydrogen type zeolite whose concentration had previously been made 30% so that the content of zeolite in the final catalyst might be 20% by weight. This mixture was spray-dried in a hot wind at a temperature of 220° C., thereafter was washed and then dried to thereby obtain Catalyst H. By the use of the remaining one silica hydrosol and according to the same procedure, there was prepared Catalyst I wherein the contents of kaolin, flash calcined alumina and zeolite were 40%, 20% and 20% respectively based on the weight of final catalyst.

Comparative Example 4

A mixture was prepared wherein kaolin was added in the silica hydrosol prepared by repeating the same procedure as Example 1 so that the amount of kaolin in the final catalyst might become 60% by weight and the aqueous suspension of the same kind of hydrogen type zeolite as used in Example 2 was added in said silica hydrosol so that the content of the zeolite in the final catalyst might become 20% by weight. The resulting mixture was spray-dried and thereafter it was washed and dried to prepare Catalyst J.

Comparative Example 5

A silica hydrosol prepared by repeating the same procedure as Example 1 was added with the flash calcined alumina of Reference Example so that its weight in the final catalyst might become 60% and further was added with the aqueous suspension of the same kind of hydrogen-type zeolite as used in Example 2 so that the content of said zeolite in the final catalyst might be 20% by weight. The resulting mixture was spray-dried, washed and then dried to prepare Catalyst K.

Example 3

A solution was prepared by adding 2086 g of sodium aluminate ($Al_2O_3$ content: 22%, $Na_2O$ content: 17.4%) and 958 g of sodium hydroxide ($Na_2O$ content: 37.8%) in 1550 cc. of water while stirring. 7176 g of silica sol ($SiO_2$ content: 30%) having a silica particle diameter of 50 Å–500 Å was added to this solution while stirring, and thereafter was kept standing at room temperature for 20 hours without stirring. Next, this mixture was heated in a water bath of 95° C. for 2 hours, and then this mixture was taken out of the water bath and cooled to the room temperature to obtain a slurry. 1345 g of silica sol ($SiO_2$ content: 30%) was added to the thus obtained slurry again with stirring, and this mixture was heated in a water bath of 95° C. for 10 days and was subjected to a filtration to remove a solid matter therefrom. The obtained solid matter was confirmed to be a high purity faujasite by means of the X-ray diffraction method. The surface area of this solid matter was measured to be 685 m²/g by means of B.E.T. method and the oxide molar ratio of said faujasite was chemically analyzed as shown below:

$$1.02Na_2O.Al_2O_3.5.5SiO_2.9.2H_2O$$

This sodium-type faujasite was subjected to ammonium ion-exchange in a conventional manner and thereafter was calcined at 550° C. for 3 hours. The obtained calcined matter was subjected to ammonium ion-exchange again and then calcining this as-wet again at 600° C. for 3 hours to thereby obtain a hydrogen-type zeolite.

Then, a silica hydrosol prepared according to the same procedure as Example 1 was added with kaolin so that its weight in the final catalyst composition might become 50%, was further added with the flash calcined alumina of Reference Example so that its weight in the final catalyst composition might become 10%, and was still further added with a 30% slurry of the above mentioned hydrogen-type zeolite so that the content of said zeolite in the final catalyst composition might become 20% by weight. The thus obtained mixture was spray-dried, washed and dried again to obtain Catalyst L.

Comparative Example 6

A silica hydrosol prepared by the same procedure as Example 1 was added with kaolin so that its weight in the final catalyst composition might become 55%, and was added with the flash calcined alumina of Reference alumina so that its weight in the final catalyst composition might become 5%, and was added further with the same kind of hydrogen-type zeolite slurry as used in Example 2 so that the content of zeolite in the final catalyst composition might become 20 wt%. The thus obtained mixture was spray-dried, washed and dried again to obtain Catalyst M.

Comparative Example 7

A silica hydrosol prepared by the same procedure as Example 1 was added with kaolin so that its weight in the final catalyst composition might become 20%, and was added with the flash calcined alumina of Reference Example so that its weight in the final catalyst composition might become 40%, and was added further with the same kind of hydrogen-type zeolite slurry as used in Example 2 so that the content of zeolite in the final catalyst composition might become 20% by weight. This mixture was spray-dried, washed and dried again to obtain Catalyst N.

Comparative Example 8

Catalyst O was obtained according to the exactly same procedure as Example 3 except that the flash calcined alumina of the present invention was replaced by an alumina having a composition $Al_2O_3.0.1H_2O$ obtained by calcining the aluminum hydroxide ($Al_2O_3.3H_2O$) prepared by the Bayer process at 850° C. for 10 seconds.

Catalytic Performance Test Example 1

Each of the catalysts A–O obtained according to the above mentioned Comparative Examples and Examples was tested with reference to its stability against heat and steam and with reference to its cracking activity. Said stability test was conducted in the manner of treating the catalyst at 760° C. for 12 hours in the air current containing 55% of steam; thereafter calcining said catalyst at 600° C. for 2 hours to measure its surface area and pore volume. The stability was evaluated in terms of the residual ratios which were calculated by dividing the values of surface area and pore volume of the catalyst subjected to the stability test by the values of surface area and pore volume of the catalyst before undergoing said steam treatment and heat treatment. While, the activity of the catalyst was tested after subjecting the catalyst to steam and heat treatments as done in the case of the stability test. Clark oil was used as feed oil. The reaction conditions employed herein were as follows: reactor temperature=492° C., WHSV=8 hr$^{-1}$, weight ratio of catalyst/feed oil=5. The obtained results are shown in Table-1 together with the compositions of the respective catalysts.

As is evident from Table-1, Catalysts E, F, H, I and L of the present invention are high in the ratio of L.C.O/H.C.O as compared with the other catalysts. This fact elucidates that these catalysts can exhibit the excellent selectivity for production of intermediate fractions. In this connection, it is to be noted that although Catalysts K and N are also high in the ratio of L.C.O/H.C.O, the amounts of coke produced are considerably larger than the catalysts of the present invention.

TABLE 1

| Catalyst | | A | B | C | D | E |
|---|---|---|---|---|---|---|
| Siliceous matrix wt % | | | $SiO_2$ $Al_2O_3$ | | | $SiO_2$ |
| | | 80 | 100 | 80 | 80 | 20 |
| Compounding agent wt % | Flash calcined alumina | 20 | — | — | — | 10 |
| | Kaolin | — | — | 20 | — | 55 |
| | Bentonite | — | — | — | 20 | — |
| Zeolite | Type | | | | | RE-Y |
| | Mixed amount wt % | — | — | — | — | 15 |
| Surface area BET m²/g | | | | | | |
| Pore volume $H_2O$ ml/g | | | | | | |
| Attrition resistance wt %/hr | | 0.16 | 0.18 | 0.19 | 0.19 | 0.12 |
| Thermal and hydrothermal stability test | | | | | | |
| Surface area residual ratio % | | 46 | 39 | 43 | 40 | 60 |

TABLE 1-continued

| | | | | | |
|---|---|---|---|---|---|
| Pore volume residual ratio % | 84 | 75 | 78 | 75 | 83 |
| Cracking test results | | | | | |
| Conversion vol % | 53 | 51 | 50 | 49 | 73.3 |
| Hydrogen wt % | 0.05 | 0.04 | 0.04 | 0.04 | 0.09 |
| (1)$C_5^+$ gasoline wt % | 36 | 33 | 35 | 34 | 48.6 |
| Coke wt % | 3.8 | 4.5 | 3.6 | 3.5 | 3.1 |
| (2)L.C.O vol % | 29 | 24 | 25 | 25 | 20.5 |
| (3)H.C.O vol % | 18 | 25 | 25 | 26 | 6.2 |
| L.C.O/H.C.O vol %/vol % | 1.61 | 0.96 | 1.00 | 0.96 | 3.31 |

| Catalyst | | F | G | H | I | J |
|---|---|---|---|---|---|---|
| Siliceous matrix wt % | | | | $SiO_2$ | | |
| | | 20 | 20 | 20 | 20 | 20 |
| Compounding agent wt % | Flash calcined alumina | 20 | — | 10 | 20 | — |
| | Kaolin | 45 | 65 | 50 | 40 | 60 |
| | Bentonite | — | — | — | — | — |
| Zeolite | Type | RE-Y | RE-Y | H-Y | H-Y | H-Y |
| | Mixed amount wt % | 15 | 15 | 20 | 20 | 20 |
| Surface area BET m²/g | | | | 152 | 170 | 128 |
| Pore volume H₂O ml/g | | | | 0.21 | 0.24 | 0.16 |
| Attrition resistance wt %/hr | | 0.13 | 0.10 | 0.09 | 0.10 | 0.10 |
| Thermal and hydrothermal stability test | | | | | | |
| Surface area residual ratio % | | 62 | 53 | 63 | 65 | 51 |
| Pore volume residual ratio % | | 85 | 74 | 80 | 89 | 72 |
| Cracking test results | | | | | | |
| Conversion vol % | | 75.0 | 67.8 | 74.9 | 76.2 | 65.2 |
| Hydrogen wt % | | 0.11 | 0.11 | 0.08 | 0.11 | 0.09 |
| (1)$C_5^+$ gasoline wt % | | 50.1 | 45.0 | 54.6 | 54.8 | 46.1 |
| Coke wt % | | 3.1 | 3.0 | 2.8 | 2.9 | 2.6 |
| (2)L.C.O vol % | | 19.5 | 20.7 | 19.8 | 19.8 | 21.4 |
| (3)H.C.O vol % | | 5.5 | 11.5 | 5.3 | 5.0 | 13.4 |
| L.C.O/H.C.O vol %/vol % | | 3.55 | 1.80 | 3.74 | 3.96 | 1.60 |

| Catalyst | | K | L | M | N | O |
|---|---|---|---|---|---|---|
| Siliceous matrix wt % | | | | $SiO_2$ | | |
| | | 20 | 20 | 20 | 20 | 20 |
| Compounding agent wt % | Flash calcined alumina | 60 | 10 | 5 | 40 | 10(4) |
| | Kaolin | — | 50 | 55 | 20 | 50 |
| | Bentonite | — | — | — | — | — |
| Zeolite | Type | H-Y | H-Y | H-Y | H-Y | H-Y |
| | Mixed amount wt % | 20 | 20 | 20 | 20 | 20 |
| Surface area BET m²/g | | 226 | 172 | 131 | 215 | 143 |
| Pore volume H₂O ml/g | | 0.28 | 0.23 | 0.17 | 0.27 | 0.19 |
| Attrition resistance wt %/hr | | 0.14 | 0.09 | 0.10 | 0.14 | 0.10 |
| Thermal and hydrothermal stability test | | | | | | |
| Surface area residual ratio % | | 68 | 67 | 53 | 67 | 52 |
| Pore volume residual ratio % | | 91 | 88 | 75 | 90 | 75 |
| Cracking test results | | | | | | |
| Conversion vol % | | 81.2 | 79.5 | 66.7 | 80.8 | 66.3 |
| Hydrogen wt % | | 0.16 | 0.09 | 0.09 | 0.16 | 0.08 |
| (1)$C_5^+$ gasoline wt % | | 51.2 | 55.1 | 47.2 | 51.0 | 48.0 |
| Coke wt % | | 4.2 | 2.7 | 2.7 | 4.1 | 2.6 |
| (2)L.C.O vol % | | 14.8 | 16.0 | 23.4 | 15.2 | 21.9 |
| (3)H.C.O vol % | | 4.0 | 4.5 | 9.9 | 4.0 | 11.8 |
| L.C.O/H.C.O vol %/vol % | | 3.70 | 3.56 | 2.36 | 3.80 | 1.85 |

(1)$C_5^+$ gasoline: Boiling point range $C_5$-204° C.
(2)L.C.O: Boiling point range 204° C.-350° C.
(3)H.C.O: Boiling point range 350° C. or more
(4)Matter prepared by calcinining the aluminum hydroxide obtained by the Bayer process at 850° C. for 10 seconds.

Catalytic Performance Test Example 2

The cracking activity of each of Catalyst J and H was evaluated relative to WHSV. Both catalysts were subjected to the same pre-treatment as Test Example 1 and measured with reference to the cracking activity according to the exactly same reaction conditions as Test Example 1 except for change in WHSV. The obtained results are shown in Table-2. As is evident from Table-2, it is observed that Catalyst H of the present invention exhibits a high selectivity concerning the production of an intermediate fraction, even when the conversion increases or decreases depending upon changes in WHSV.

TABLE 2

| Catalyst | | J | | | | H | | | |
|---|---|---|---|---|---|---|---|---|---|
| WHSV hr⁻¹ | | 4 | 8 | 12 | 16 | 4 | 8 | 12 | 16 |
| Cracking test results | Conversion vol % | 69.3 | 65.2 | 60.7 | 57.2 | 78.1 | 74.9 | 70.7 | 67.1 |
| | Hydrogen wt % | 0.11 | 0.09 | 0.09 | 0.07 | 0.10 | 0.08 | 0.07 | 0.07 |
| | $C_5^+$ gasoline | 48.3 | 46.1 | 43.5 | 41.9 | 54.2 | 54.6 | 52.6 | 50.4 |
| | Coke | 3.1 | 2.6 | 2.3 | 2.2 | 3.4 | 2.8 | 2.6 | 2.5 |
| | L.C.O | 20.1 | 21.4 | 23.0 | 23.7 | 17.3 | 19.8 | 21.8 | 23.8 |
| | H.C.O | 10.6 | 13.4 | 16.3 | 19.1 | 4.6 | 5.3 | 7.5 | 9.1 |
| | L.C.O/H.C.O vol %/vol % | 1.90 | 1.60 | 1.41 | 1.24 | 3.76 | 3.74 | 2.91 | 2.62 |

What is claimed is:

1. A method for preparing a catalyst composition for cracking hydrocarbons, which consists essentially of: spray drying an aqueous slurry containing
   (i) flash calcined alumina particles which have been prepared by contacting aluminum hydroxide which has been made by the Bayer process, with hot air having a temperature in the range of 350° to 700° C., for 5 seconds or less,
   (ii) kaolin,
   (iii) a precursor of a siliceous inorganic oxide matrix, and
   (iv) a crystalline aluminosilicate zeolite,
   to obtain catalyst particles consisting essentially of from 10 to 30 wt.% of said flash-calcined alumina, from 30 to 55 wt.% of said kaolin, from 3 to 40 wt.% of said crystalline aluminosilicate zeolite and the balance is said siliceous inorganic oxide matrix.

2. A method according to claim 1 wherein said siliceous matrix is silica.

3. A method according to claim 1 wherein the siliceous matrix is a silica-alumina.

4. A method according to claim 1 wherein both of said flash calcined alumina and said kaolin have a hexagonal laminar crystal structure.

5. A method according to claim 1 wherein the catalyst particles have pores of a diameter of from 1000 to 3000 Angstrom units, as measured by a porosimeter.

6. A method according to claim 1 in which said zeolite is rare earth exchange zeolite Y or hydrogen exchanged zeolite Y.

7. A method according to claim 1 in which said flash calcined alumina particles are chi-alumina particles.

* * * * *